Aug. 4, 1964　　　F. WHEATLEY, JR　　　3,143,136
CHECK VALVE
Filed Oct. 31, 1960　　　　　　　　　　2 Sheets-Sheet 1

INVENTOR.
FRANK WHEATLEY JR.
BY
Paul H. Johnson
ATTORNEY

INVENTOR.
FRANK WHEATLEY JR.
BY
*Paul H. Johnson*
ATTORNEY 3,143,136
CHECK VALVE
Frank Wheatley, Jr., Tulsa, Okla., assignor to Frank Wheatley Pump & Valve Mfg., Tulsa, Okla., a corporation of Oklahoma
Filed Oct. 31, 1960, Ser. No. 65,980
1 Claim. (Cl. 137—527.8)

This invention relates to improvements in a check valve. More particularly the invention relates to a check valve having improvements whereby spherical solid members flowing in the line may pass freely through the check valve but where the check valve nevertheless includes positive closure means.

In recent years the use of spherical physical members in flow lines, particularly in the oil industry, has become increasingly important. One application occurs when a fluid line is used for conducting more than one petroleum product. When a transition is made from one product, for instance crude oil, to a different product, as an example gasoline, to prevent contamination of both fluids by the other, a physical means is positioned in the line to separate the two divergent fluids. The best method found of accomplishing this separation is to place in the line a spherical rubber ball. The ball is ordinarily of a diameter conforming approximately to the internal diameter of the pipe. The ball is usually hollow and it is inflated with water so that it will have approximately the same, or a slightly higher, specific gravity than the fluids being moved through the line. By making the ball hollow, flexibility is incorporated in the ball so that it will change in shape to pass through projections in the line or deformities caused by portions of the line being out of round.

Another application for the use of spherical balls is as a means of removing condensate from gas lines. A ball is inserted into the gas line and is moved through the line by the pressure of gas flowing in the line. When condensate, which is usually trapped in low places in the line, is encountered, the ball moves the condensate in front of it. In this manner, by passing a series of balls through gas lines, condensates may be substantially kept from accumulating in the line. Condensates are harmful in gas lines in that usually they are hydrates which freeze in cold weather and frequently will completely seal the lines. Other applications include the passage of physical objects through lines to remove paraffin accumulations.

Equipment has been manufactured to insert and remove the spherical balls from pipe lines. One difficulty which has to the present time not been adequately overcome is the provision of a check valve which will permit passage of balls, but will positively close to prevent fluid flowing in the opposite direction.

The present invention contemplates a novel check valve adaptable for passing a physical object therethrough with a minimum retardation but which nevertheless has a positive closing action against reverse fluid flow. Broadly stated the invention may be defined as: In a check valve positioned in a fluid conducting line and having a clapper pivotably supported about an axis, the method of adapting said valve to pass a physical object and to close positively against reverse fluid flow comprising positioning said valve in said line whereby said axis is at an angle with the vertical, said angle being the minimum angle at which said clapper will pivot to closed position when there is no flow in said line.

It is therefore an object of this invention to provide a check valve for use in lines which will permit passage of physical devices, but which will nevertheless have a positive function to close and thereby prevent reverse fluid flow through the line.

Another object of this invention is to provide a check valve which will exert a minimum force against the passage of a physical device but which will automatically close after the device is passed when the fluid flow stops.

Another object of this invention is to provide a check valve which will exert a minimum restriction to the passage of a physical object in the line in which the valve is inserted, and which will have a positive closure action to close the line against reverse flow of fluid after the passage of the physical object, but which will require no springs, levers, weights or other attachments.

These and other objects and a better understanding of the invention may be had by referring to the following description and claim taken in conjunction with the attached drawings in which:

Figure 1:
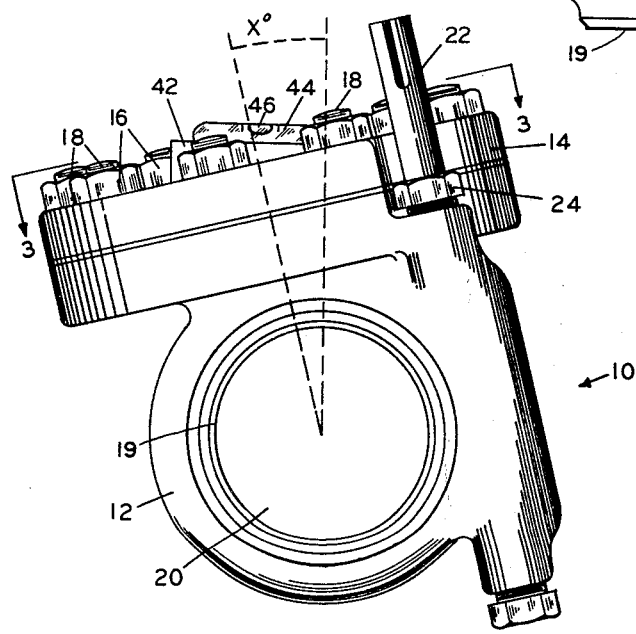
FIGURE 1 is an end view of the valve of this invention.

Referring first to FIGURE 1 the valve is indicated generally by the numeral 10. The valve is formed of a body 12 which is cast to the internal and external configurations shown in the drawings and machined where necessary. A cover 14 is supported to body 12 by bolts 16 engaging studs 18. By removing bolts 16 cover 14 may be removed, exposing the internal mechanism of the valve 10. An opening 19 extends through the valve body 12. Opening 19 is at least the diameter of the line (not shown) to which the valve is attached so that fluids and gases as well as physical objects can pass through the valve. Pivoted to body 12 and seen through opening 19, is valve clapper 20. The manner in which clapper 20 is pivoted to the body 12 and the function of the exact manner in which pivotation occurs will be described in detail subsequently.

Arm pin 22 is secured within body 12 to clapper 20 so that clapper 20 pivots about the axis of arm pin 22 by movement of the flow of liquid or gas through the valve.

A gland nut 24 serves to maintain packing around arm pin 22 secure so that leakage of fluid between the arm pin 22 and the body 12 will be prevented.

Figure 2:
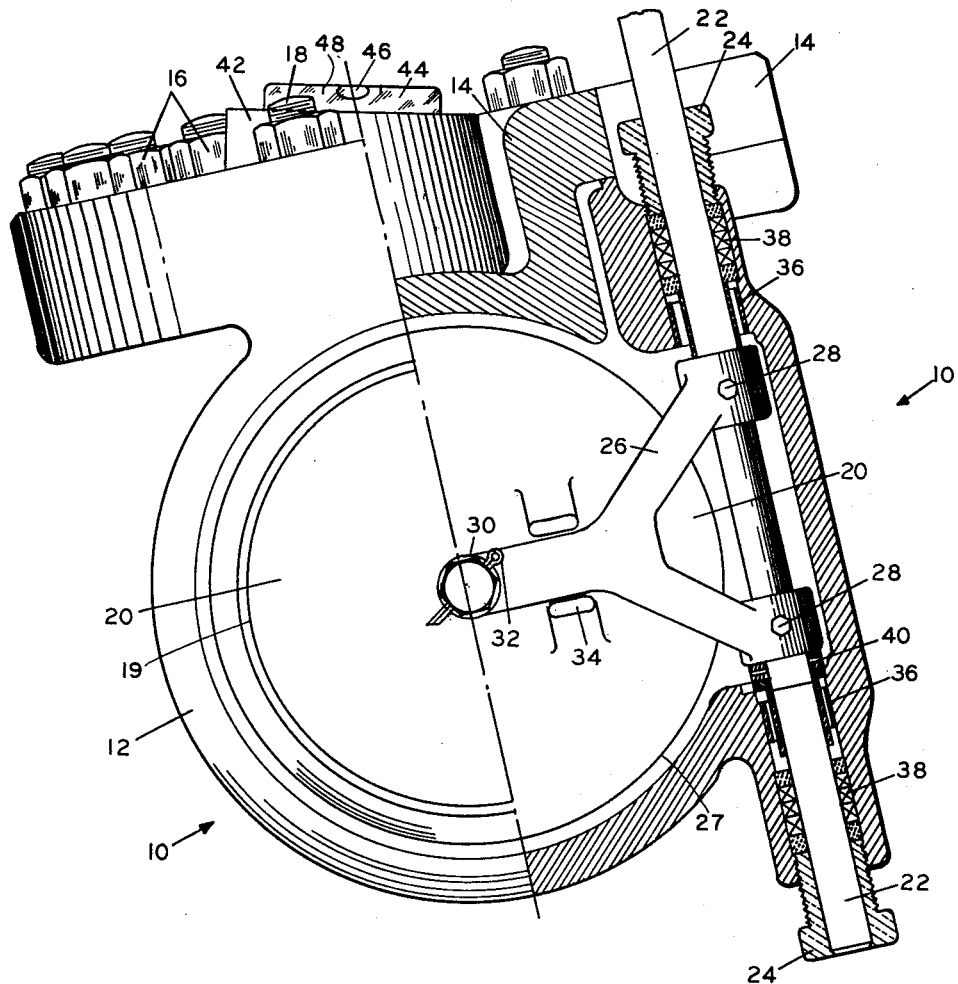
FIGURE 2 is an end view, similar to FIGURE 1, but showing the valve partially in cross-section to disclose the internal construction.

Referring now to FIGURE 2, the internal construction of the valve is shown. Clapper 20 is supported to arm pin 22 by arm 26. Set screws 28 securely affix the arm 26 to arm pin 22. A clapper nut 30, restrained in position by cotter pin 32, secures the clapper 20 to arm 26. Positioning bosses 34 integrally formed with clapper 20, serve to maintain clapper 20 and arm 26 in a fixed relationship. Clapper 20 pivots against valve seat 27 formed in valve body 12.

Needle bearings 36 are positioned between arm pin 22 and body 12 insuring free pivotation of clapper 20 with respect to body 12. Packing 38 is provided between arm pin 22 and body 12 so that fluid flowing through the valve, and the line to which the valve is affixed, cannot escape. Gland nuts 24 threadably enagage body 12 and surround arm pin 22. Gland nuts 24 are adapted to engage packing 38 so that by threading gland nuts 24 inwardly, pressure is placed against packing 38 to prevent fluid or gas leakage.

To further insure that minimum frictional restriction will exist to retard the pivotation of clapper 20, a thrust bearing 40 is positioned between the lower surface of arm 26 and body 12. The weight of clapper 20 and arm 26 is primarily supported by thrust bearing 40. Thrust bearing 40, in conjunction with needle bearings 36, provide a bearing arrangement insuring a very minimum of frictional retardation of the pivotation of clapper 20 relative to body 12.

Figure 3:
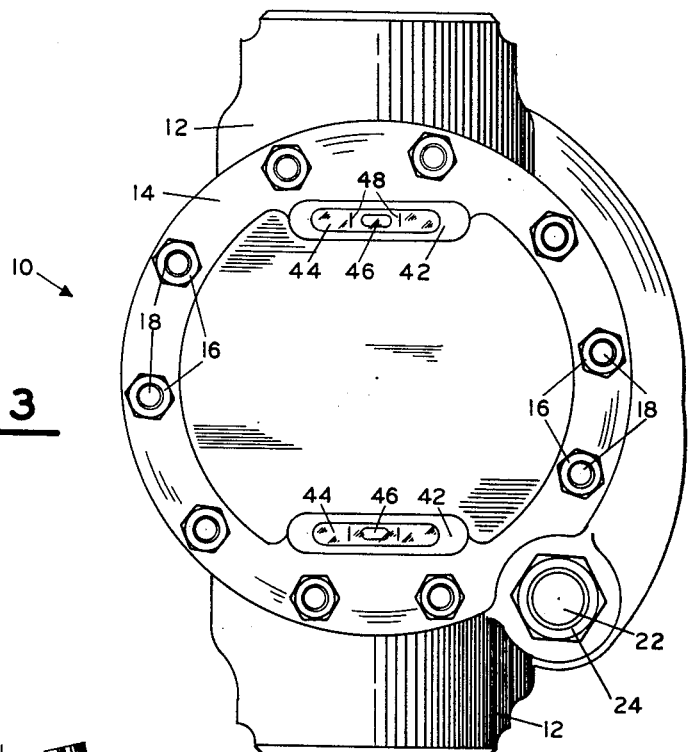
FIGURE 3 is a top view of the valve taken along the line 3—3 of FIGURE 1.

Integrally formed with cover 14 is a leveling pad 42. Secured to the top surface of leveling pad 42 is a bubble or spirit level 44. This is best shown in FIGURE 3. The spirit level 44 is typically formed of a glass tube having a liquid therein which fills all of the space within the tube except for a bubble of air 46. The bubble 46, when centered between marks 48, indicates that the level 44 is horizontal, which in turn means that the upper surface of leveling pads 42 is horizontal.

*Operation*

Most check valves utilizing a clapper arrangement are designed to be installed so that the clapper rises vertically as fluid flows through the valve. The arm pin 22 is positioned substantially horizontally and the clapper 20, pivoting about arm pin 22, pivots in a vertical plane. By this arrangement the weight of the clapper 20 and arm 26 serves to automatically restrain the clapper 20 to a closed position. Any fluid flow, sufficient to pivot the weight of the clapper 20 a few degrees, opens the clapper from engagement with the valve seat 27 and permits fluid flow. Any slight tendency of the fluid in the line to flow in the opposite direction, augmented by the weight of the clapper 20, causes the clapper to close, preventing reverse fluid flow. This system wherein the clapper rises in a substantially vertical plane functions satisfactorily except that the weight of the clapper 20 and arm 26 is ordinarily so great that it will not be forced sufficiently out of the way to permit the passage of a ball or other physical device through the line.

Another means of providing a positive closing check valve is to position the valve 10 so that arm pin 22 is vertical. In this position clapper 20 pivots in a horizontal plane. In order to provide positive closure of clapper 20, a spring arrangement (not shown) is affixed to apply resilient rotational force to arm pin 22. This arrangement works satisfactorily if the amount of force which is required to pivot clapper 20 is not critical. When it is necessary to pass a physical object, such as a ball as previously mentioned, through the valve, it has been found that adjustment of the spring tension which will, on one hand, be small enough to permit the ball to pass through, but on the other hand will be sufficiently great to close the clapper 20 when fluid flow ceases, is not feasible to obtain. In attempting to adjust spring pressure it has been learned that either the spring will be adjusted to supply too much resilience so that the fluid flow is not able to push the ball through the valve, or if it is adjusted so that the ball will pass, the spring pressure is not sufficient to close the clapper 20 after the ball has passed. Even if accurate spring tension applying torsional resiliency to arm pin 20 is attained under ideal conditions, in field conditions it has been learned that the change in resiliency of the spring soon occurs so that the check valve either will not permit the ball to pass through the line, or will not close properly to prevent fluid reverse flow in the line.

It has been learned that unexpected and thoroughly dependable results have been obtained by the expediency of positioning the check valve 10 in the fluid line at a particular angular relationship of arm pin 22 with respect to the vertical. By providing the combination of needle bearings 36 and thrust bearing 40 and the proper angular displacement of the axis of arm pin 22 relative to the vertical, a position is attained wherein the weight of the clapper 20 and arm 26 is sufficient to cause the valve to close when forward fluid flow ceases but is not sufficient as to prevent the passage of a physical object through the valve. Utilizing this simple but extremely effective arrangement, a valve has been achieved making feasible the use of check valves in lines wherein physical bodies are to be passed through the line, which does not require any springs or other adjustments necessary to maintain the valve in proper calibration to function as required.

The provision of level 44 makes positioning of the valve in the field to conform to the angular displacement, determined in factory investigations, very easy and simple to attain. In positioning the valve in the line, whether it is to be welded or bolted into position, the workmen merely place the valve so that the small bubble 46 is within the marks 48 and the valve is then secured into position. Once the valve is positioned in the line there is nothing to change or to get out of adjustment.

The provision of the level 44 positioned on a leveling pad 42 makes possible accurate positioning of the valve so that it will function properly. The angle indicated in FIGURE 1 by "X" degrees, for proper functioning of the valve, depends upon the size of the valve. It has been determined, for instance, that in a two inch valve angle "X" should be approximately twenty degrees that is, the axis of arm pin 22 is tilted twenty degrees from the vertical. As the size of the valve 10 increases, so that the clapper 20 and arm 26 become heavier, the angle required becomes less. For instance, in sixteen inch valves the angle required is only eight degrees. Intermediate size valves require angular dispacements between these extremes. Smaller valves than two inches will take correspondingly larger angle displacements. As the valves becomes larger it is found that increase in size begins to make less and less difference in the angle required so that valves larger than sixteen inches will require substantially eight degrees displacement or a very small amount less than this.

In determining the angular displacement the level 44 is adjusted so that with no flow through the valve, and with the clapper 20 pushed open as it would occur when a ball or other physical object passes through, the valve will barely swing closed when released.

Some latitude exists in the exact angular displacement required for any given size valve. The angular displacement is required to be small enough that the weight of the clapper 20 can be overcome by the physical object passing through, and yet the angle must be large enough so that once the object has passed through the clapper 20 closes automatically.

The valve 10 is normally positioned horizontally in a line as measured by an axis passing through the valve opening 19 coinciding with the tubular axis of pipe (not shown) to which valve is attached. Slight deviations in setting the valve opening 19 horizontally will not disturb the functioning of the valve.

The invention as disclosed, is a simple and yet completely unobvious answer to a problem which has existed in industry. The effect of the invention is to provide a check valve having automatic means of permitting passage of a physical object, exerting a minimum force to act as a retardation of the passage, and to close positively when fluid flow ceases in the line to prevent the flow of fluid in the opposite direction.

Although this invention has been described with a certain degree of particularity it is manifested that many changes may be made in the details of construction and the arrangement of components without departing from the spirit and scope of this disclosure.

I claim:

A positive closing check valve adaptable for passing a physical object therethrough, comprising:

a valve body having an axial opening therethrough:

a seat formed in said valve body surrounding said opening;

a clapper supported to pivot about an axis within said body, said axis extending in a plane perpendicular to the axis of said opening in said valve, the axis about which said clapper pivots displaced at an angle of approximately 8 to 20 degrees from the vertical, said clapper having a seating surface formed thereon adaptable to engage, when said clapper is pivoted to closed position, said seat formed in said valve body;

means externally of the valve whereby said angle of displacement from the vertical of the axis about which said clapper pivots is indicatable whereby said angle of displacement from the vertical of the axis about which said clapper pivots is such that said clapper barely pivots closed when no flow occurs in the valve.

References Cited in the file of this patent

UNITED STATES PATENTS

| | | |
|---|---|---|
| 2,172,371 | Feighan | Sept. 12, 1939 |
| 2,383,482 | Hirshstein | Aug. 28, 1945 |
| 2,502,171 | Pashby | Mar. 28, 1950 |
| 2,961,836 | Hanson | Nov. 29, 1960 |

FOREIGN PATENTS

| | | |
|---|---|---|
| 139,544 | Australia | Nov. 28, 1950 |